UNITED STATES PATENT OFFICE.

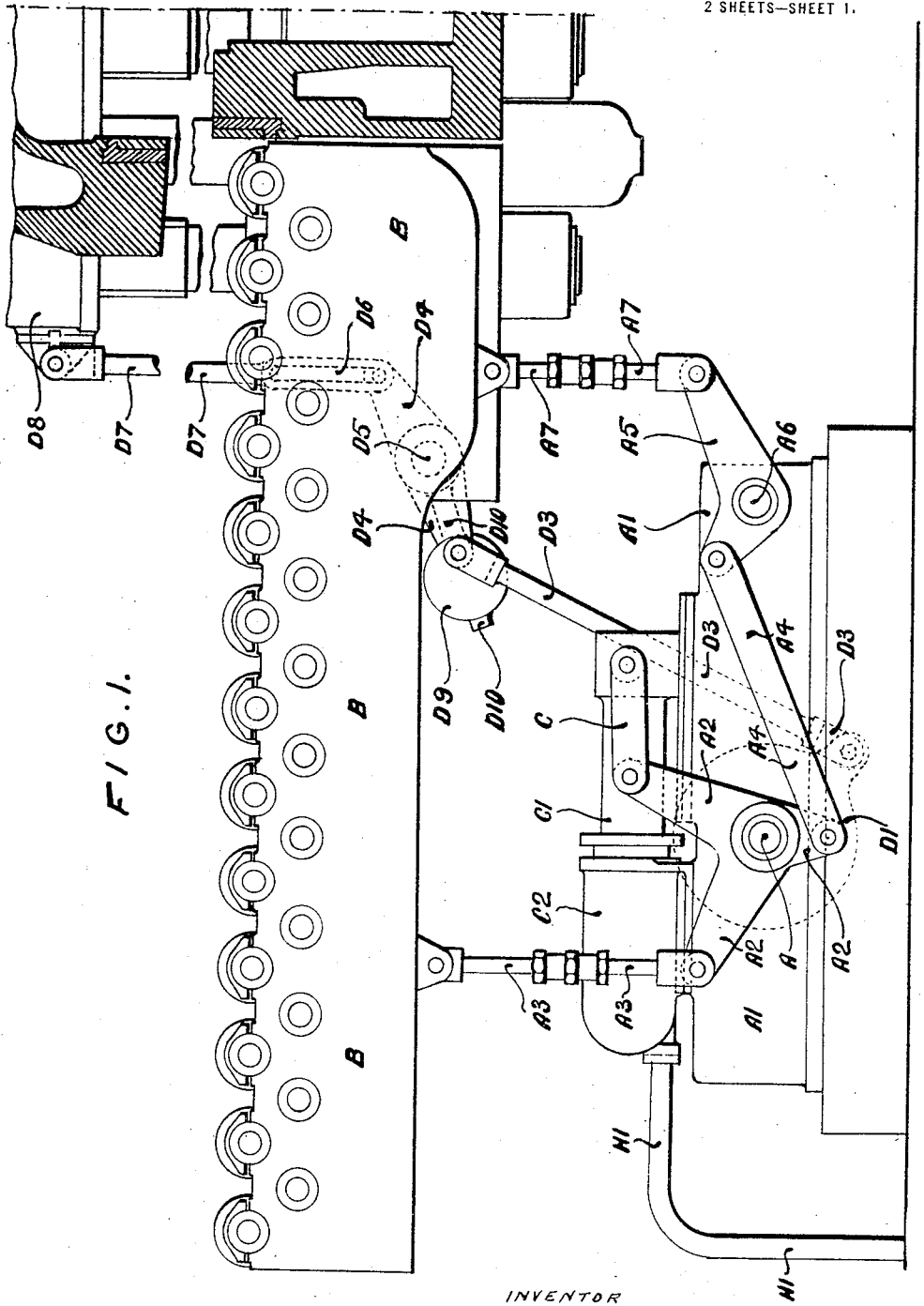

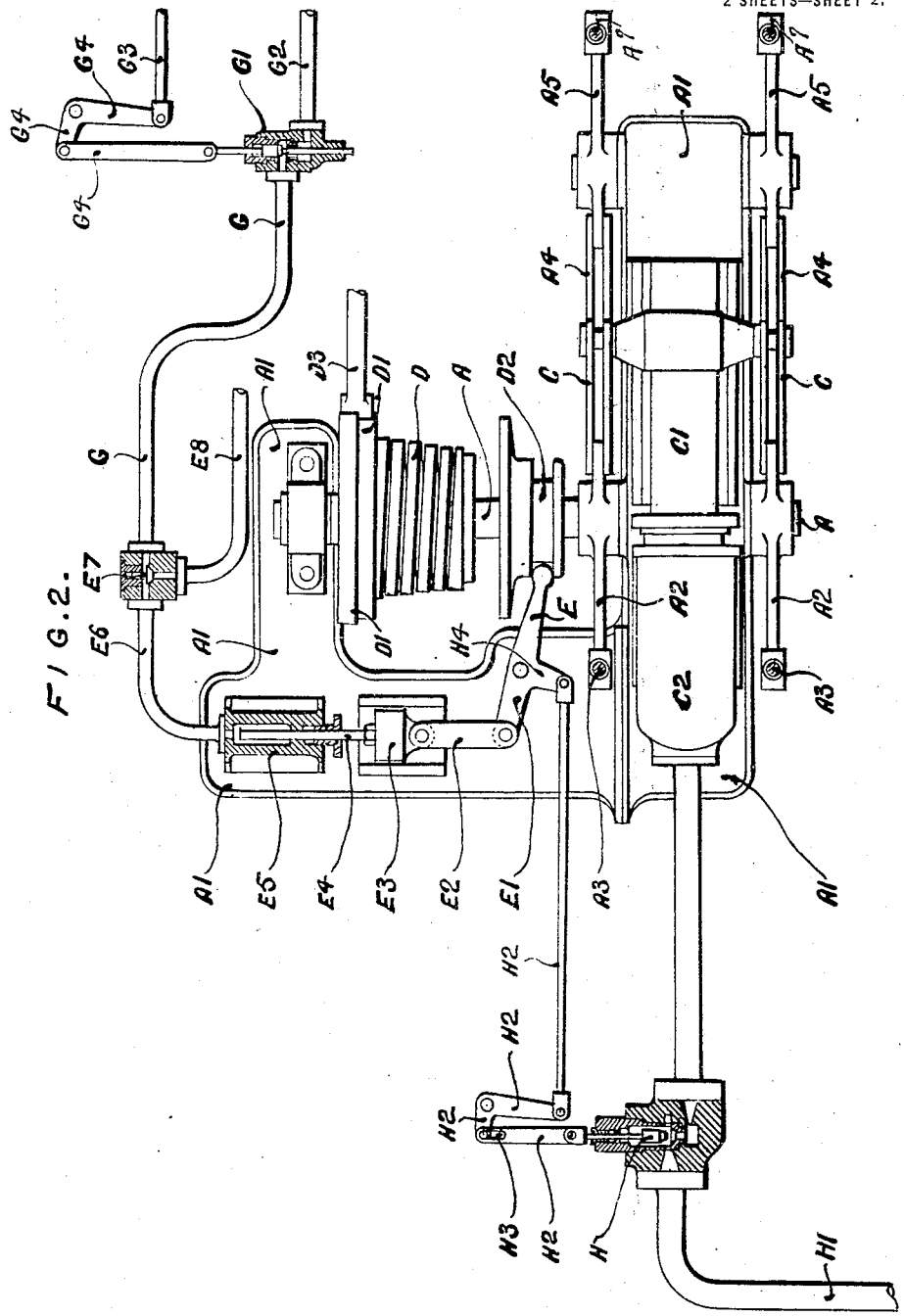

THOMAS EDMUND HOLMES, OF GLASGOW, SCOTLAND.

HYDRAULIC SHEARING-PRESS.

1,287,315.

Specification of Letters Patent. Patented Dec. 10, 1918.

Application filed June 11, 1918. Serial No. 239,399.

*To all whom it may concern:*

Be it known that I, THOMAS EDMUND HOLMES, a subject of the King of Great Britain and Ireland, and a resident of Glasgow, Scotland, have invented certain new and useful Improvements in connection with Hydraulic Shearing-Presses, of which the following is the specification.

The invention relates to hydraulic shearing presses and like machines in which a rising and falling table is used to receive the work, and has for its object to provide improved and simple means for operating this table in suchwise that while it supports the portion of work being severed, its descent during that severance is not brought about by pressure applied by the work.

According to the invention the table, which is supported on interconnected parallel motion levers and the weight of which is preferably hydraulically counterbalanced in usual manner, is mechanically interconnected with the ram or other equivalently moving member of the press in suchwise that it may, under conditions hereinafter explained, be constrained to move therewith. In this positive mechanical connection between the table and the moving member of the press is firstly a lost motion device permitting of the shear blade or other tool being brought up to the work without there being movement of the table, and secondly a clutch device by which the operative mechanical connection between press member and table may be made and broken. This clutch device is operated by intensifier or other pressure applied to the main ram or rams of the press, so that when that pressure is given access to the ram or rams the mechanical connection between table and press member is simultaneously made. Means may also be provided for retaining the table in its depressed position when the tool rises after performance of the cut, such means being preferably hydraulic and under control of the main hand-lever of the press.

An illustrative example of the carrying out of the invention is shown on two accompanying sheets of drawings, Figure 1 being a side elevation, while Fig. 2 is a plan of part thereof.

In this example there are fast on a horizontal transverse shaft A mounted in a table-carrying base $A^1$ two similar three armed levers $A^2$ one arm of each of which is connected by an adjustable link $A^3$ with the rising and falling table B, and a second arm by a link $A^4$ with a two armed lever $A^5$ (of which of course there are also two) on a shaft $A^6$. The other arms of the two levers $A^5$ are connected by adjustable links $A^7$ with the table B—thus forming as a whole the usual parallel motion for the table B.

The third arms of the levers $A^2$ are connected by links C with the ram $C^1$ of the usual hydraulic table-balancing cylinder $C^2$.

On the shaft A there is loosely mounted one member D of a coil clutch, the other member $D^1$ of that clutch being fast upon the shaft. The two members of the clutch are operated for engagement and disengagement by the endwise movement of a muff $D^2$ sliding upon the shaft A. The free member D of the clutch is connected by a link $D^3$ with a two armed lever $D^4$ on a shaft $D^5$ in the press base. The other arm of this lever $D^4$ engages a slot $D^6$ in the lower end of a link $D^7$ pivotally mounted upon the moving head $D^8$ of the press. A counterbalance weight $D^9$ is provided on a lever $D^{10}$ on the shaft $D^5$. The slot $D^6$ in the link $D^7$ provides the lost motion hereinbefore referred to between the parts.

The clutch operating muff $D^2$ is engaged by the arm E of a lever pivoted upon the base frame and having a second arm $E^1$ connected by a link $E^2$ with a slipper block $E^3$ on a ram $E^4$ in an hydraulic cylinder $E^5$, a pipe $E^6$ from which is connected through a non-return valve $E^7$ with a pipe $E^8$ in open communication with the intensifier supply to the press. The non-return valve box is connected above the valve $E^7$ with a pipe G connecting with a valve $G^1$ controlling communication by way of a pipe $G^2$ with the exhaust. The valve $G^1$ is under the control of a rod $G^3$ connected by links and levers $G^4$ with the press-operating hand-lever (not shown).

The table-balancing cylinder $C^2$ is connected by way of a valve H with pipes $H^1$ communicating with the accumulator. The rod of the valve $H^1$ is connected by levers and links $H^2$ in which there is a lost-motion device consisting of a slot $H^3$ with an arm $H^4$ on the clutch-operating lever.

With this arrangement it will be seen that the table is retained in lowered position by closure of the non-return valve $E^7$ so long as the valve $G^1$ controlling communication with the exhaust remains closed, but upon that valve being operated through its connection with the usual hand-lever (not shown) the table rises under its control.

Again, the connection between the arm H⁴ of the clutch-operating lever and the valve H controlling communication between the cylinder G² and the accumulator is such that when the clutch is freed the valve is opened.

In operation the tool may be freely moved to and from the work by manipulation of the usual lifting rams without movement being communicated to the table B, since the clutch members D, D¹ being out of engagement, the member D which connects with the rocking shaft A merely swings idly thereon. Upon pressure liquid being admitted to the main ram or rams, the clutch however is immediately thrown by its ram E⁴, and the idle motion in the slot D⁶ of the link D⁷ having been taken up, the table B is constrained to fall by direct mechanical connection with the moving member of the press.

What I claim is:—

1. An hydraulic press having a rising and falling table, a press head associated therewith and having an interruptible mechanical connection thereto, and means operated by the press-actuating pressure fluid for establishing said mechanical connection.

2. An hydraulic press having a rising and falling table, a press head associated therewith and having an interruptible, lost-motion, mechanical connection thereto, and means operated by the press-actuating pressure fluid for establishing said mechanical connection.

3. An hydraulic press having a rising and falling table, a press head associated therewith and having a lost-motion, mechanical connection therewith, a clutch in said connection, and means operated by the press-actuating pressure fluid for closing the clutch.

4. An hydraulic press having a rising and falling table, a rocking member operatively connected thereto, a press head associated with said table, a second rocking member operatively connected thereto, a clutch device interposed between said rocking members, and means for controlling said clutch.

5. An hydraulic press having a rising and falling table, a rocking member operatively connected thereto, a press head associated with said table, a second rocking member operatively connected thereto, a clutch device interposed between said rocking members, and means operated by the press-actuating pressure fluid for controlling said clutch.

6. An hydraulic press having a rising and falling table, a press head associated therewith and having an interruptible mechanical connection thereto, and means operated by the press-actuating pressure fluid for establishing said mechanical connection, together with press-operative control means and a valve operatively associated therewith for controlling the discharge of the pressure fluid from the means by which the mechanical connection is established between the press head and table.

7. An hydraulic press having a rising and falling table, an hydraulic table-balancing cylinder associated therewith, a press head coöperating with the table having an interruptible mechanical connection therewith, together with press-operation control means and a valve operatively associated therewith for controlling the discharge of pressure fluid from said table-balancing cylinder.

8. An hydraulic press having a rising and falling table, an hydraulic table-balancing cylinder associated therewith, a press head coöperating with the table and having an interruptible mechanical connection therewith, and means operated by the press-actuating pressure fluid for establishing said mechanical connection, together with press-operation control means and valve means operated thereby for controlling the discharge of pressure fluid from said table-balancing cylinder and from the means by which the mechanical connection is established between the press head and catch.

In testimony whereof I have signed my name to this specification, in the presence of two subscribing witnesses.

THOMAS EDMUND HOLMES.

Witnesses:
  DAVID FERGUSON,
  WILFRED HUNLY.

Copies of this patent may be obtained for five cents each, by addressing the "Commissioner of Patents, Washington, D. C."